June 15, 1954
A. H. LLOYD
2,680,910
CHALK LINE HOLDER
Filed March 23, 1953
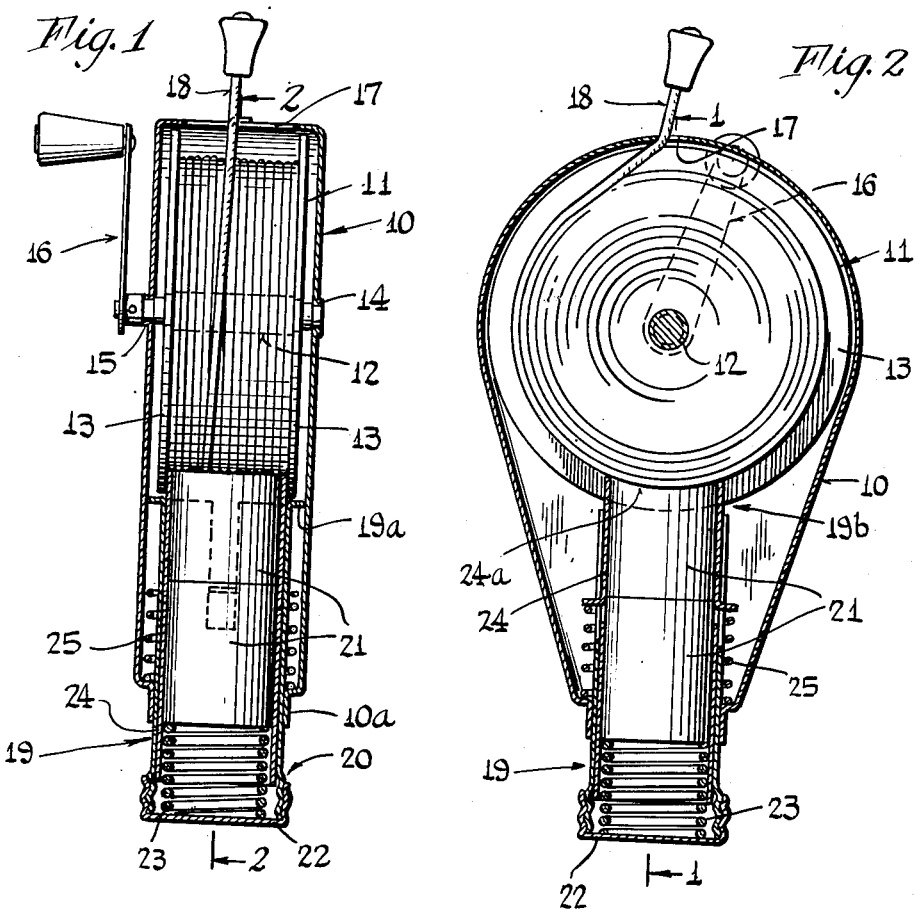
INVENTOR.
Aubrey H. Lloyd
BY
Johnson and Kline
ATTORNEYS Patented June 15, 1954

2,680,910

UNITED STATES PATENT OFFICE 2,680,910

CHALK LINE HOLDER

Aubrey H. Lloyd, Norwalk, Conn.

Application March 23, 1953, Serial No. 344,153

5 Claims. (Cl. 33—87)

This invention relates to a chalk line holder, and particularly to novel means for applying chalk to the line.

Heretofore, chalk line holders have been provided in which the line is wound on a reel contained in a sealed case in which loose chalk is positioned to engage the line in the case. The difficulty with this type of construction resides in the fact that loose chalk, even though the case is sealed and the opening through which the line passes is provided with a resilient closure, sifts out of the casing and becomes objectionable. Efforts to overcome this difficulty have been made by providing a piece of chalk over which the line passes as it moves out of the casing. This, however, subjects the chalk to but brief contact with the line and does not provide sufficient chalk on the line.

The present invention overcomes the difficulties heretofore encountered by providing a chalk line reel in which chalk is substantially prevented from sifting therefrom and in which a sufficient quantity of chalk is applied to the line.

This is accomplished by providing the casing having the reel therein with means for confining and holding the chalk, preferably in slick form, in engagement with the line wound on the reel. Thus the danger of loose chalk sifting out of the casing is eliminated. Furthermore, as succeeding turns of line are wrapped around the barrel of the reel, the line in the layer will continue to be engaged by the chalk and have a sufficient amount applied thereto to perform its intended function.

In the preferred form of the invention a novel chalk holder is provided which maintains the chalk in contact with the wound line and which also provides means whereby the chalk can be replenished quickly and conveniently.

Other features and advantages of the invention will be apparent from the specification and claims when considered in connection with the drawings in which:

Figure 1 shows a longitudinal transverse section of the device taken along lines 1—1 of Fig. 2.

Fig. 2 shows a longitudinal section of the device taken along lines 2—2 of Fig. 1.

As shown in the drawings the device of the present invention comprises a casing 10 having a reel 11 mounted therein. The reel is provided with a barrel 12 upon which the line is wound and a pair of end flanges 13. The reel shaft is journaled in bearings 14, 15 in the sides of the casing with one end of the shaft projecting therethrough and a handle 16 secured to the projecting end whereby the reel may be rotated to wind the line thereon. At one end of the casing there is provided a line-receiving opening 17 through which the line 18 passes as it feeds to and from the reel. Preferably the line-receiving opening is elongate, as shown, to facilitate winding of the line on the reel. In accordance with the present invention the casing is provided with a novel chalk holder in the form of a tubular member 19 in which the chalk is disposed.

While the chalk holder may be located on the casing as desired it is herein illustrated as being mounted on the end of the casing opposite the line-receiving opening 17 and the casing extended as shown in Fig. 1 to enclose a substantial portion thereof. The tubular member is secured to the neck 19a of the casing and has ears 19a at the forward end to anchor the same to the casing as shown in Fig. 1.

In the preferred form of the invention the tubular member has an inner open end 19b which faces the reel and is of such a width as to extend between the flanges of the reel as shown in Fig. 1. The outer end 20 opens to the exterior of the casing and provides a means whereby chalk 21 preferably in stick form may be readily inserted without having to open the casing. The outer end is closed by a threaded closure 22. The chalk is urged forwardly in the tubular member into engagement with the line as it is wound on the barrel by any suitable means. As herein illustrated this means comprises a spring 23 positioned under the closure with one end bearing on the closure and the other end applying pressure to the outer end of the chalk stick. If desired, the tubular member may be provided with an extension in the form of a slidable sleeve 24 which is yieldably urged toward the barrel of the reel by a spring 25. Preferably the barrel engaging end is curved at 24a, as shown in Fig. 2, so as to closely fit the barrel and the line wound therein.

In operation, when the reel is empty the tubular extension with the chalk therein will engage the barrel. As the handle is turned, the reel winds the line on the barrel and the extension will be pushed back against spring 25 by each layer. Thus the chalk will always be maintained in contact with the line wound on the reel.

It will be seen that with the device of the present invention the chalk will have substantial contact with the line as it will engage the line in each layer during the time necessary to wind the layers.

Furthermore, with the foregoing arrangement the pressure of the chalk against the line being wound will tend to spread the line into a level wind rather than permit bunching of the line in one spot.

While a wiper adjacent the opening 17 may be provided for the line if desired, in the preferred form of the invention it is not found to be necessary inasmuch as the amount of powdered chalk in the casing is a minimum because of the stick chalk being applied to the line on the reel.

From the foregoing it will be apparent that I have produced a chalk line reel which is simple to construct and clean in use and which may be conveniently refilled with chalk when necessary.

Variations and modifications may be made within the scope of the claims and portions of the improvements may be used without others.

I claim:

1. A chalk line holder comprising a casing having a line-receiving opening; a reel rotatably mounted in the casing to wind the line thereon; a chalk stick carried by the casing; and means urging the chalk stick into engagement with the line wound on the reel to apply chalk thereto.

2. A chalk line holder comprising a casing having a line-receiving opening; a reel provided with flanges rotatably mounted in the casing to wind the line thereon; a tubular member carried by the casing and opening on the reel, said tubular member extending for substantially the full width of the reel between said flanges; chalk carried by the tubular member; and means urging the chalk into engagement with the line wound on the reel between the flanges to apply chalk thereto.

3. A chalk line holder comprising a casing having a line-receiving opening; a reel provided with flanges rotatably mounted in the casing to wind the line thereon; a tubular member carried by the casing and opening on the reel, said tubular member extending for substantially the full width of the reel between said flanges and having a yieldable extension engaging and following the layers of line wound on the reel; a chalk stick slidably carried by the tubular member; and means urging the chalk stick into engagement with the line wound on the reel between the flanges to apply chalk thereto.

4. A chalk line holder comprising a casing having a line-receiving opening; a reel provided with flanges rotatably mounted in the casing to wind the line thereon; a tubular member carried by the casing and having its inner end opening on the reel and having its outer end opening to the exterior of the casing, said tubular member extending for substantially the full width of the reel between said flanges; a chalk stick insertable through the opening in the outer end of the tubular member and slidably carried by the tubular member; a closure for the outer end of the tubular member; and means disposed under the closure and applying pressure to the outer end of the chalk stick to urge the chalk stick into engagement with the line wound on the reel between the flanges to apply chalk thereto.

5. A chalk line holder comprising a casing having a line-receiving opening; a reel provided with a barrel and flanges at the ends thereof, said reel being rotatably mounted in the casing to wind the line thereon; a tubular member carried by the casing and having its inner end opening on the reel and having its outer end opening to the exterior of the casing, said tubular member extending for substantially the full width of the reel between said flanges; a chalk stick insertable through the opening in the outer end of the tubular member and slidably carried by the tubular member; a closure threaded on the outer end of the tubular member; and means comprising a spring disposed under the closure and engaging the outer end of the chalk stick and urging the chalk stick into engagement with the line wound on the barrel of the reel between the flanges to apply chalk thereto.

References Cited in the file of this patent

UNITED STATES PATENTS

| Number | Name | Date |
|---|---|---|
| 2,400,926 | Harding | May 28, 1946 |